United States Patent
Walker

(10) Patent No.: US 7,407,173 B2
(45) Date of Patent: Aug. 5, 2008

(54) VEHICLE SUSPENSION SYSTEM

(76) Inventor: Peter John Walker, 44 St. Michaels Dr., Roxwell (GB) CM1 4NU ( * ) Notice: Subject to any disclaimer, the term of this patent is extended or adjusted under 35 U.S.C. 154(b) by 0 days.

(21) Appl. No.: 10/447,898

(22) Filed: May 29, 2003

(65) Prior Publication Data

US 2003/0205880 A1 Nov. 6, 2003

Related U.S. Application Data

(63) Continuation-in-part of application No. 09/889,468, filed as application No. PCT/GB01/00144 on Jan. 15, 2001, now abandoned.

(30) Foreign Application Priority Data

Jan. 25, 2000 (GB) .................................. 0001520.6
Jun. 5, 2000 (GB) .................................. 0013464.3

(51) Int. Cl.
*B60G 3/04* (2006.01)

(52) U.S. Cl. ..................... 280/124.134; 280/124.135; 280/124.145; 280/5.508; 280/5.509

(58) Field of Classification Search .......... 280/124.125, 280/124.134, 124.135, 124.136, 124.145, 280/124.15, 5.507, 5.508, 5.509, 5.52, 5.521
See application file for complete search history.

(56) References Cited

U.S. PATENT DOCUMENTS

| | | | | |
|---|---|---|---|---|
| 4,014,564 A | * | 3/1977 | Coble .................. | 280/124.107 |
| 4,515,390 A | * | 5/1985 | Greenberg ................ | 180/903 |
| 4,550,926 A | * | 11/1985 | MacIsaac ............. | 280/124.103 |
| 4,621,699 A | * | 11/1986 | Slazas ....................... | 180/53.7 |
| 4,696,152 A | * | 9/1987 | Kinzenbaw ................. | 180/41 |
| 4,854,603 A | * | 8/1989 | Scaduto ............... | 280/124.104 |
| 4,881,752 A | * | 11/1989 | Tanaka ................ | 280/124.128 |
| 4,973,070 A | * | 11/1990 | Menichini et al. ........ | 280/5.521 |
| 5,108,126 A | * | 4/1992 | Banse ................. | 280/124.136 |
| 5,306,034 A | * | 4/1994 | Buchanan ............ | 280/124.135 |
| 5,324,056 A | * | 6/1994 | Orton .................. | 280/124.106 |
| 5,496,055 A | * | 3/1996 | Shibahata et al. ........... | 267/188 |
| 5,558,361 A | * | 9/1996 | Shin ........................... | 267/259 |
| 5,746,134 A | * | 5/1998 | Scheffel ...................... | 105/168 |
| 5,820,150 A | * | 10/1998 | Archer et al. ............ | 267/141.2 |
| 6,267,387 B1 | * | 7/2001 | Weiss ......................... | 280/5.52 |
| 6,406,036 B1 | * | 6/2002 | Laurent et al. ........... | 280/5.509 |
| 6,637,758 B2 | * | 10/2003 | Woo ........................ | 280/5.521 |
| 6,719,313 B2 | * | 4/2004 | Zadok ................. | 280/124.106 |
| 6,789,812 B2 | * | 9/2004 | Peterson .............. | 280/124.152 |

* cited by examiner

*Primary Examiner*—Toan C To
(74) *Attorney, Agent, or Firm*—Barnes & Thornburg LLP

(57) ABSTRACT

A motor vehicle chassis structure which includes an independent suspension system including left and right suspension components for left and right wheels (4, 8) respectively for gripping and travelling along a road surface, each of which suspension components is arranged to allow a constrained up and down movement of the respective wheel relative to the vehicle chassis structure, characterised in that the upper suspension components on one side of the vehicle are cross-linked with the upper suspension components on the other side of the vehicle by a connecting rod (10, 11) and an offset pivot shaft assembly (9, 5), so as to constrain the plane of each wheel towards an orientation which is normal to the road surface while allowing the chassis structure to move vertically and to roll relative to said wheels during cornering, acceleration, deceleration and combinations thereof.

6 Claims, 6 Drawing Sheets

FIGURE 1   CHASSIS LEVEL

VEHICLE SUSPENSION SYSTEM

RELATED APPLICATIONS

This application is a continuation-in-part of U.S. patent application Ser. No. 09/889,468, filed Jul. 16, 2001, now abandoned, which is the national filing of international application number PCT/GB01/00144 filed Jan. 15, 2001.

BACKGROUND OF THE INVENTION

The present invention relates to suspension systems for vehicles.

Generally a motor vehicle incorporating independent suspension (i.e. not a solid axle) either at the front or the rear of the vehicle will have a chassis structure which includes a suspension system including left and right suspension components for left and right wheels respectively, each of which is arranged to allow a constrained up and down movement of the respective wheel relative to the chassis structure. A commonly encountered example is the well-known double wishbone suspension system.

The term chassis structure is used herewith to refer both to the chassis of a vehicle having a discrete chassis, to the corresponding load bearing part of a monocoque body (that is a vehicle body where the chassis and body are combined in one unit), and to any combination of the above, for example to the chassis component of a monocoque body with subframes.

With such independent suspension systems the suspension components win normally possess a geometry which enables each respective suspended wheel to compensate for roll of the chassis structure during cornering and still remain relatively perpendicular to the road surface so maintaining an optimum tyre-to-road contact patch and thereby maximum grip. In order to achieve this result the camber angle of each wheel has to change with respect to the chassis structure as the suspension is compressed or extended during cornering. (This contrasts with the requirement for a motorcycle where the tyre profile is round and the contact patch is unaffected by the angle of lean).

Suspension is compressed or extended as a consequence of longitudinal weight transfer. For example, when the vehicle is subject to high acceleration there is longitudinal weight transfer directed to the rear of the vehicle thereby compressing the rear suspension and causing the rear wheels to adopt a negative camber, that is to say the rear wheels become inclined inwards. At the same time the front suspension extends causing the front wheels to adopt a positive camber. This then significantly reduces the level of contact of the tyres with the road. The converse arises when decelerating due to braking in which weight transfer goes forward and the rear suspension extends while the front suspension is compressed. In this case also the problem of compromised tyre-to-road contact arises.

The present invention is concerned with solving this problem without compromising the measures required for cornering, and in particular with ensuring maximum grip during cornering and during acceleration or deceleration and with intermediate situations involving both.

Several theoretical solutions to this problem have been devised but their commercial appeal has been tempered by a variety of attendant concerns commonly focusing on excessive complexity, cost, friction, NVH (noise/vibration/harshness), space & packaging demands and inherent roll centre, suspension travel and other design limitations.

SUMMARY OF THE INVENTION

The present invention provides a simple and commercially viable solution while affording low friction, intrinsic compactness, greater design freedom and an ability to achieve its objectives while allowing the use of rubber mounted lower suspension arms.

Accordingly the invention provides a motor vehicle chassis structure which includes an independent suspension system including left and right upper and lower suspension components for left and right wheels respectively for gripping and travelling along a road surface, each of which suspension components is arranged to allow a constrained up and down movement of the respective wheel relative to the chassis structure, characterised in that the upper suspension components on one side of the vehicle are cross-linked independently of the lower suspension components with the upper suspension components on the other side of the vehicle, so as to constrain the rotational plane of each wheel towards an orientation which is normal to the road surface while allowing the chassis structure to move vertically and to roll relative to said wheels during cornering, acceleration, deceleration and combinations thereof.

Generally with conventional tyres, this means that each wheel will be constrained in a position where it is substantially perpendicular, ie perpendicular, or within a few degrees of being perpendicular, to the road surface.

The invention applies to left and right suspension components for left and right wheels respectively either in the form of a front suspension system of a vehicle or in the form of a rear suspension system of a vehicle or in both.

While the invention can be carried out by the use of direct mechanical links across the vehicle between left and right wheel upper suspension components respectively, it is also possible to provide embodiments of the invention where a cross-linking action is achieved by hydraulic or pneumatic or other links. For example movement of the upper suspension arm, suspension upright or other interposed arm or link can be used to operate a hydraulic actuating cylinder. Hydraulic pipes or hoses can then transfer movement to an operating cylinder on the opposite side of the vehicle which would affect a correction of camber, either through moving the top pivot arm axis (as shown in the specific example), or through the use of an extending/telescopic top arm, or through a specially constructed suspension upright. The invention utilises the forces produced during cornering to reduce vehicle roll and allows for the magnitude of this effect to be modified in a variety of ways, by altering leverage ratios within the system, by changing the lateral distance between the wheel centrelines and the sprung arm outer pivots, and/or by mounting suspension spring units, acutely inclined to the vertical, to the chassis at their upper ends and to the top arms or upper sections of the suspension uprights at their lower ends. This latter method will generally be detrimental to ride quality and would not normally be acceptable in a vehicle designed for road use. However, this is not usually an important consideration in the design of a vehicle for track use, where performance and cornering ability is of greater importance than comfort.

BRIEF DESCRIPTION OF THE DRAWINGS

An embodiment of the invention will now be described by way of example with reference to the accompanying diagrammatic drawings in which.

DESCRIPTION OF THE PREFERRED EMBODIMENTS

Figure 1:
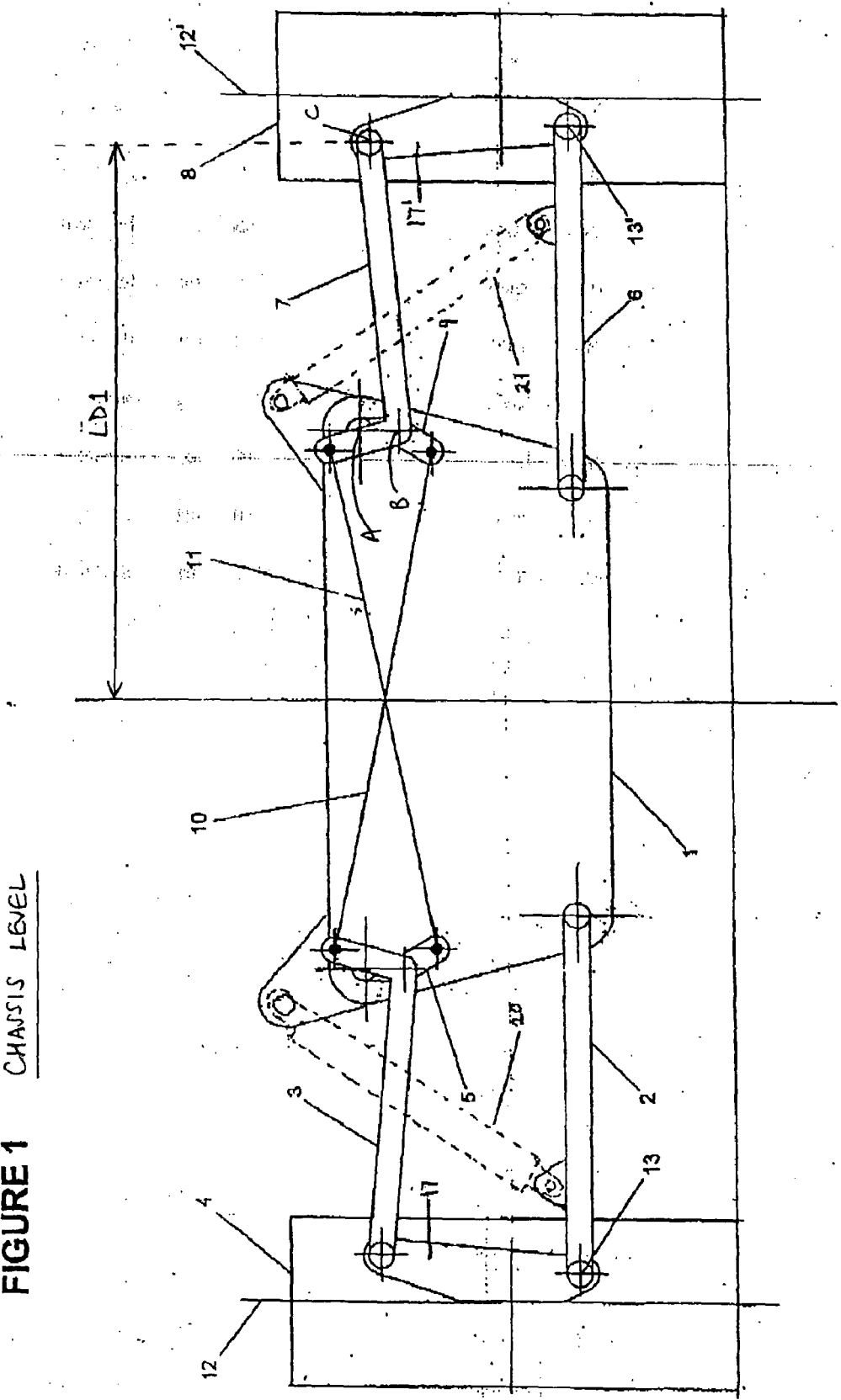
FIG. 1 is an end elevation of the left and right suspension components of a dual arm (double wishbone) rear suspension system of a rear wheel driven vehicle shown in the normal ride position.

Referring to FIG. 1, a diagrammatic representation of the rear view of a dual arm rear suspension system of a rear wheel driven vehicle is shown.

A chassis structure I is connected by a left hand bottom arm 2, and also by a left hand top arm 3, (via an offset pivot shaft assembly 5) to a wheel and tyre assembly 4.

The right hand suspension assembly is a mirror image of the left hand suspension assembly and involves a right hand bottom arm 6, a right hand top arm 7, a right hand offset pivot shaft assembly 9, and a right hand wheel and tyre assembly 8, all similarly attached to the chassis structure 1.

In accordance with the present invention the left and right upper suspension components are cross connected by connecting rod 10, linking left hand top arm 3, to right hand offset pivot shaft assembly 9, and connecting rod 11, linking right hand top arm 7, to left hand offset pivot shaft assembly 5.

The cross-connection so described constrains the plane of each wheel (ie the overall disposition of the wheel perpendicular to its axis of rotation) towards an orientation which is substantially normal to the road surface, and thereby ensures maximum tyre-to-road contact both during cornering and during acceleration and deceleration. At the same time the linkages enable the chassis structure to move vertically and to roll relative to these wheels.

The following is an example of how this is achieved.

Figure 2:
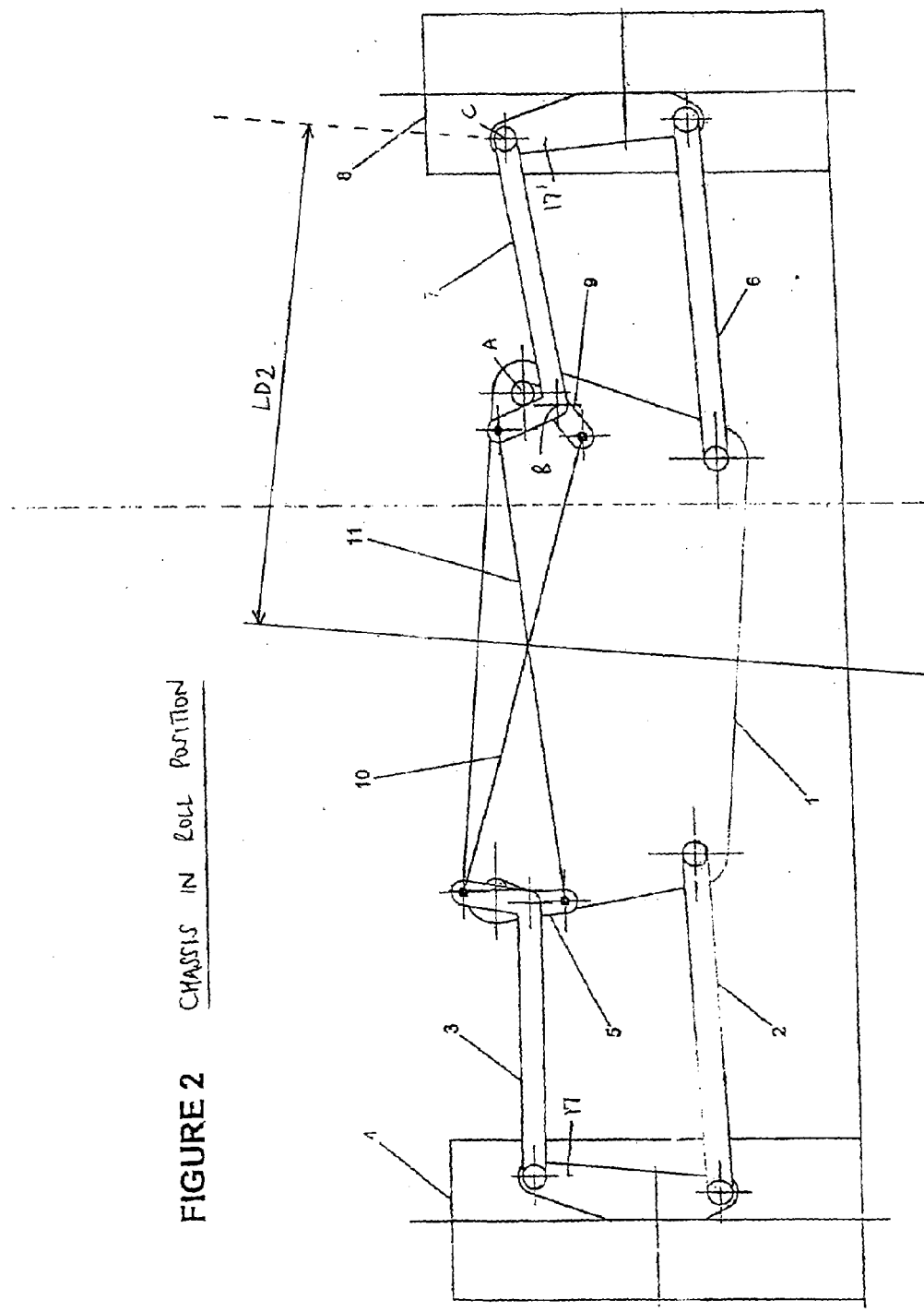
FIG. 2 is the same suspension system shown with the vehicle cornering.

When cornering, say to the left (see FIG. 2), the chassis structure 1, rolls towards the outside of the bend and the right hand suspension assembly moves up relative to the chassis structure and the left hand suspension assembly moves down relative to the chassis structure. As is normal with this type of suspension system, even without the cross-connection afforded by this invention, when the right hand top arm 7, pivots upwards, its geometry in relation to the right hand bottom arm 6, produces an increase in negative camber of the right hand wheel and tyre assembly 8, relative to the chassis structure (ie the wheel tilts inwards with respect to the chassis structure) to compensate for chassis/body roll and enable the wheel to remain substantially normal to the road surface.

With this invention, part of this required camber compensation is achieved by the action of connecting rod 10, and its offset pivot shaft assembly 9, which translates the simultaneous downward movement of the left hand top arm 3, into an inward lateral movement of the right hand top arm 7. Thus a vertical movement of the wheel on one side of the vehicle provides a compensating change in the lateral inclination of the wheel on the other side.

Similarly, and in reverse fashion, the action of connecting rod 11, and offset pivot shaft assembly 5, contribute to the increase in positive camber of the left hand wheel and tyre assembly 4, with respect to the chassis structure (ie this wheel also remains substantially normal to the road surface), again to compensate for body/chassis roll.

An additional function of the connecting rods 10 and 11, and offset pivot shaft assemblies 9 and 5, is to use the forces generated during cornering to reduce chassis/body roll.

Figure 3:
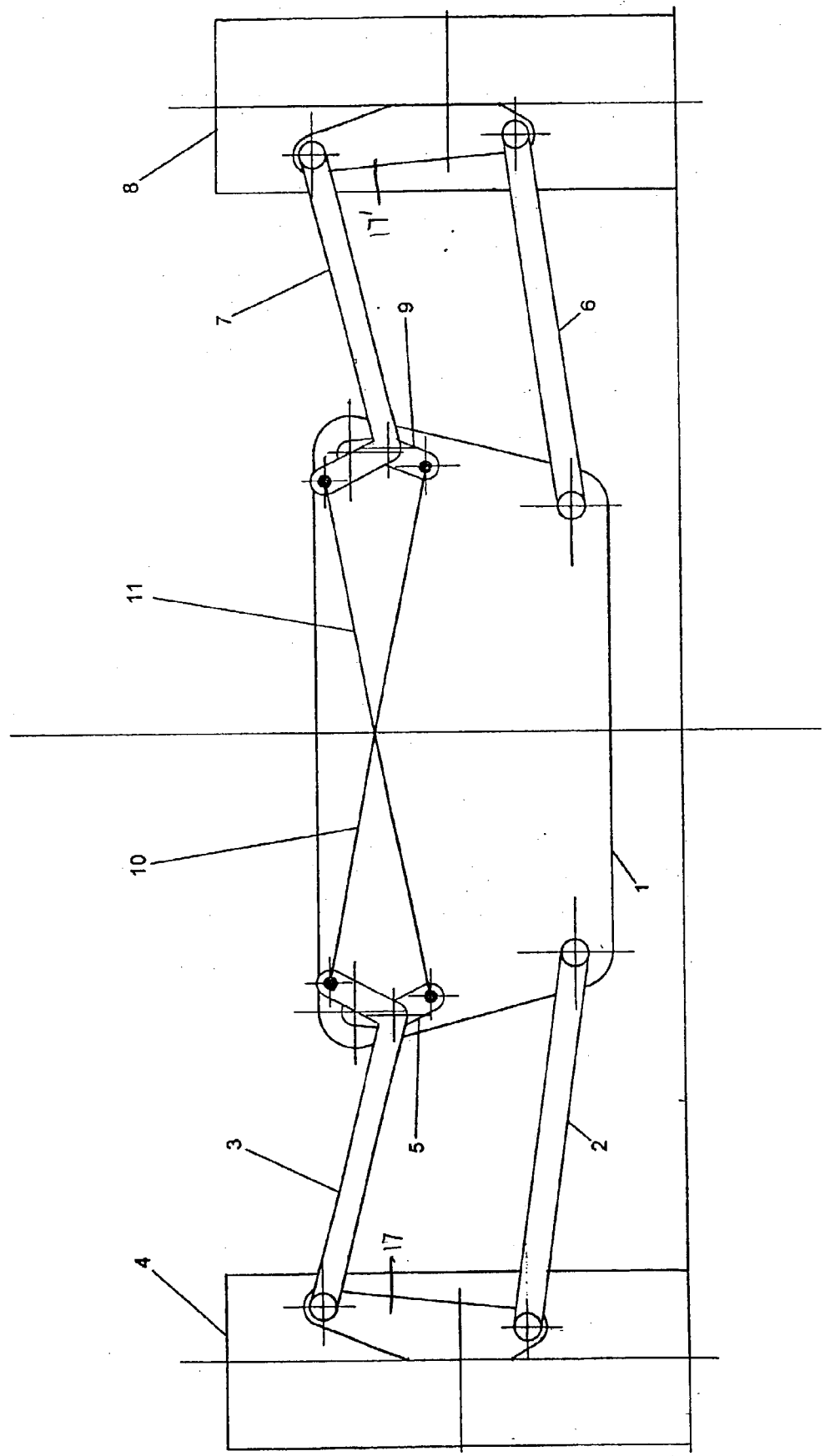
FIG. 3 is the same suspension system shown with the suspension fully compressed.

When accelerating in a straight line (see FIG. 3), the effects of longitudinal weight transfer compress the suspension on both sides. In a normal dual arm suspension system of this kind this would lead to the adoption of negative camber on both wheels, (ie both wheels tilting inwards) compromising the tyre-to-road contact and therefore grip. With this invention, the upward movement of the two upper arms 3 and 7, acts via the connecting rods 10 and 11, and offset pivot shaft assemblies 9 and 5, to move the top arms laterally outwards, away from the centreline of the vehicle, thus ensuring the wheels remain substantially perpendicular to the road surface and the tyre-to-road contact patches remain at an optimum for tractive grip. Again it will be seen that a vertical movement of the wheel and tyre assembly relative to the chassis structure on one side of the vehicle provides a compensating change in the lateral inclination of the wheel on the other side.

Figure 4:
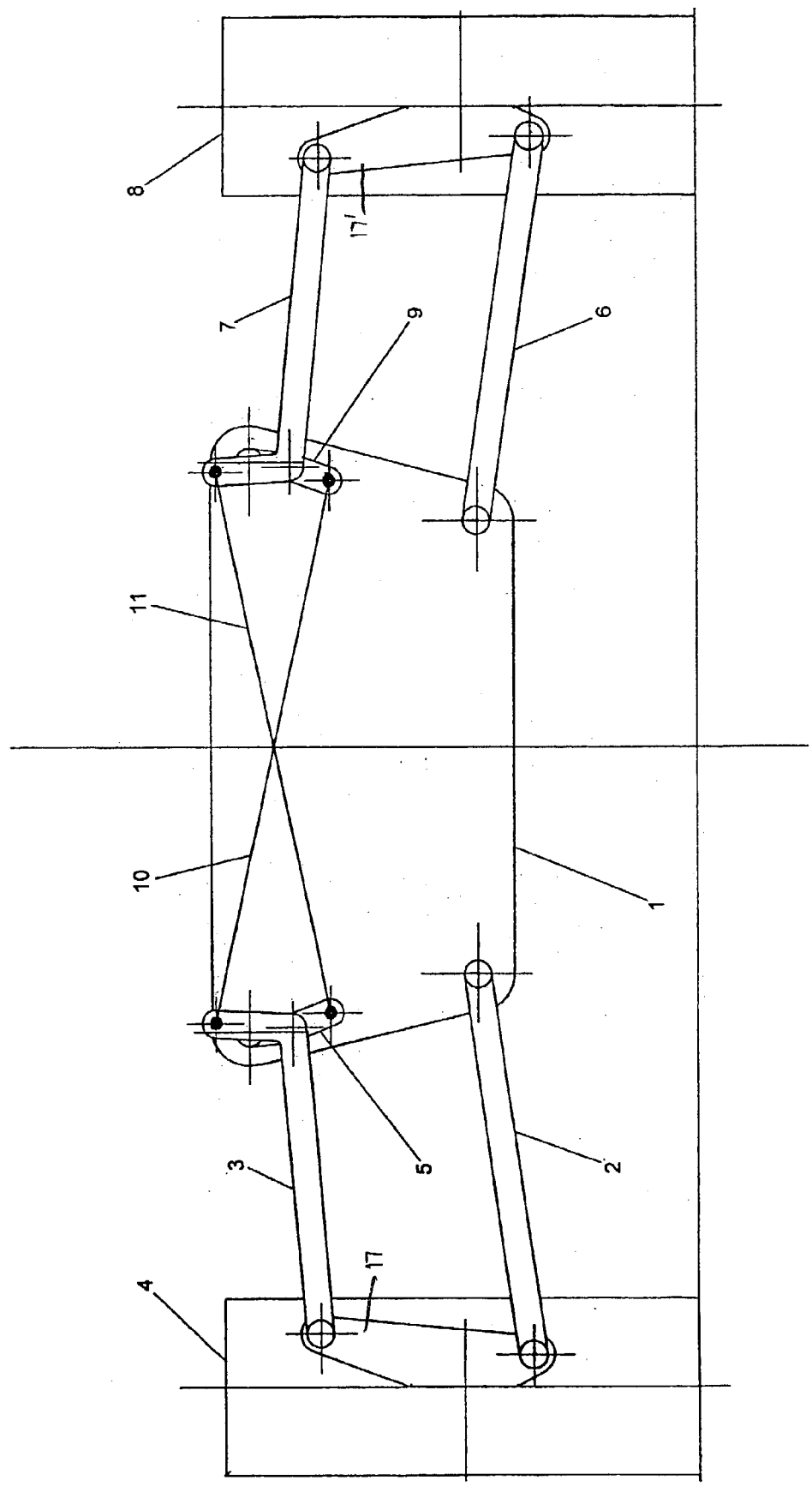
FIG. 4 is the same suspension system shown with the suspension fully extended.

Similarly, when decelerating in a straight line (see FIG. 4), the effects of longitudinal weight transfer extend the suspension on both sides, which in a normal dual arm suspension system of this kind would lead to the adoption of unwanted positive camber. In this instance also, the action of the two connecting rods 10 and 11, and offset pivot shaft assemblies 9 and 5, act to move the two top arms 7 and 3, in compensation for this effect, this time by moving the two top arms laterally inwards. Thus again the wheels are held substantially perpendicular to the road surface and the tyre-to-road contact remains at the optimum for maximum braking grip.

In the embodiment of the invention shown in FIG. 1, suspension spring units 20, 21 act between the chassis structure I and each of the bottom arms 2 and 6 (the lower suspension components), so avoiding interaction between suspension spring loadings and the cross-linked upper suspension components. With suspension spring units 20, 21 so mounted, the inherent abililty of this embodiment to affect the degree of vehicle roll when cornering, can be modified by altering the leverage ratios within the system and/or the lateral distance between the wheel centrelines 12 (12') and the sprung arm outer pivots 13 (13') of the bottom arms 2, 6.

As illustrated, wheel mountings or suspension uprights 17, (17') support the respective wheels 4, (8). The left hand bottom arm 2 and the left hand top arm 3 have outboard ends pivotally connected to the wheel mounting or suspension upright 17. Similarly, the right hand bottom arm 6 and right hand top arm 7 have outboard ends connected to the wheel mounting or suspension upright 17'.

Figure 5A:
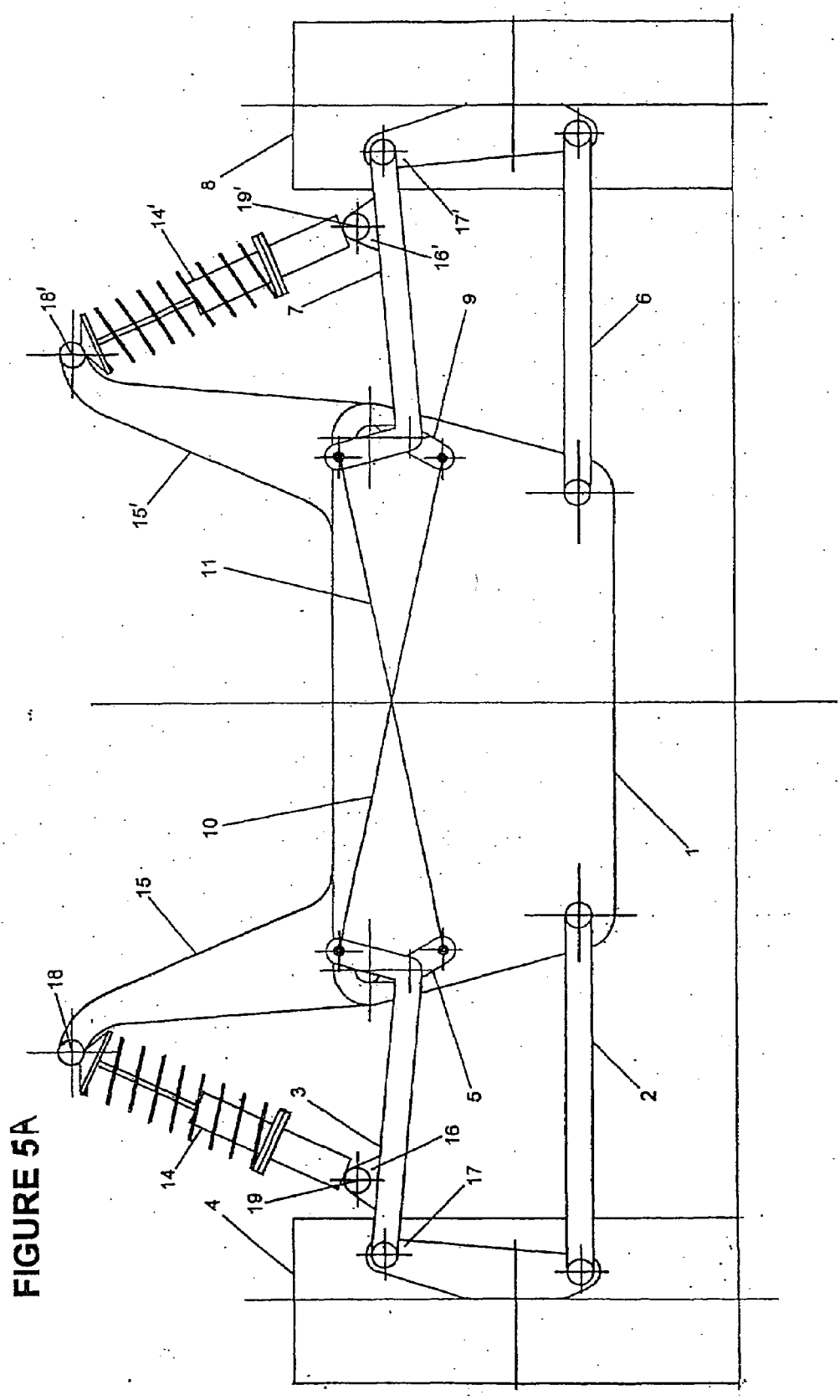
FIG. 5A illustrates how a spring suspension unit can be fitted between a top arm and the chassis.
Figure 5B:
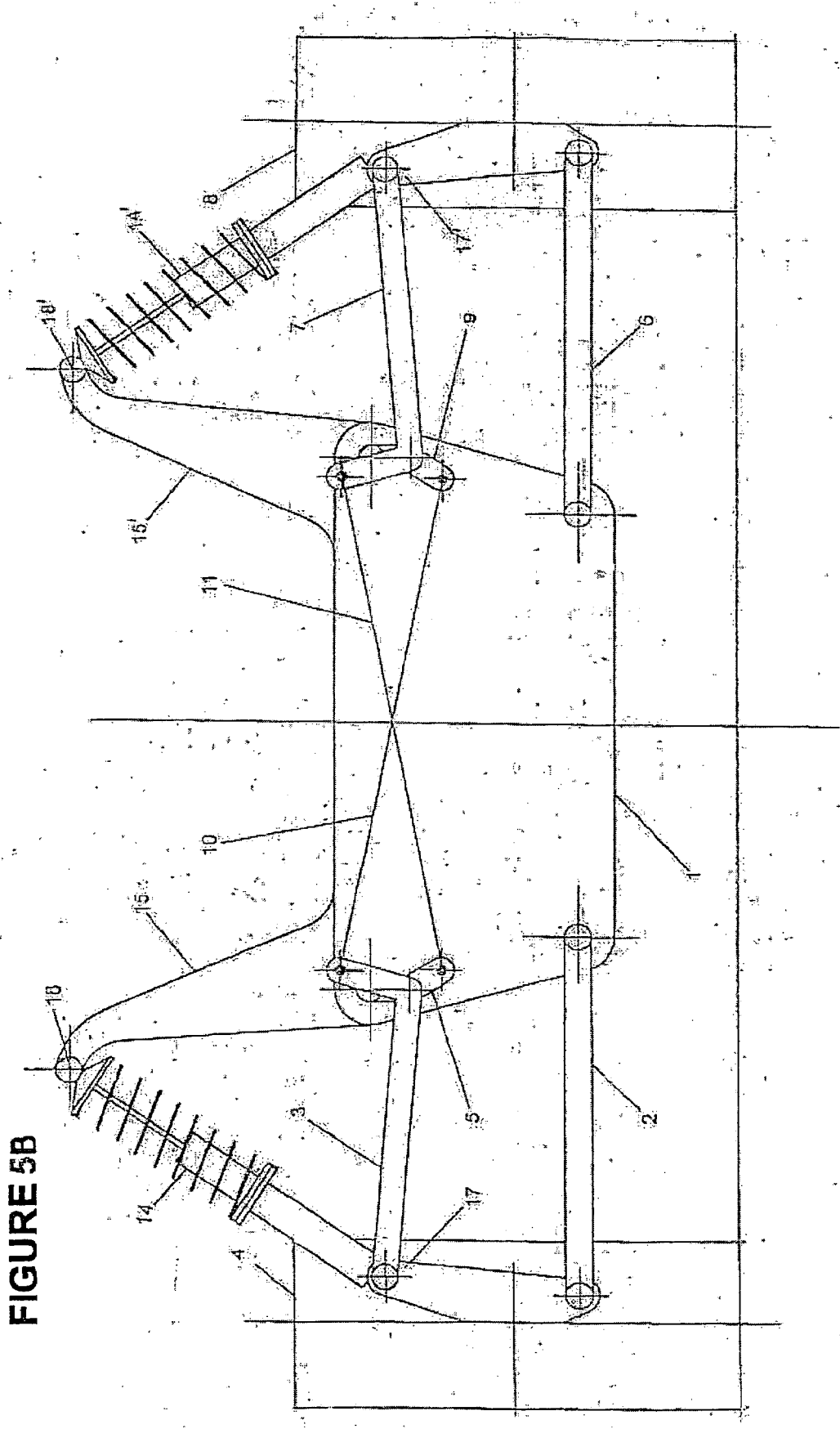
FIG. 5B illustrates an alternative form of how a spring suspension unit can be fitted between a top arm and the chassis.

FIGS. 5A and 5B show a modification of the last mentioned arrangement. Here the system's ability to affect vehicle roll can be modified by pivotally mounting suspension spring units 14, (14') at opposite ends 1.8, 19 (18', 19) between upper support brackets 15, (15') attached to the chassis, and either lower support brackets 16, (16') attached to the top arms 3 (7), or the upper part of the wheel mountings or suspension uprights 17, (17'). The ability of the arrangement to affect the degree of roll can then be modified by altering the angle of inclination to the vertical of the suspension spring units 14, (14').

The invention claimed is:

1. A motor vehicle chassis structure comprising:
   a chassis, left and right wheel mountings supporting left and right wheels respectively for travelling along a road surface, and an independent suspension system including left and right upper and lower suspension components having outboard ends directly connected in use to upper and lower portions of the left and right wheel mountings respectively, the suspension components being arranged in use to allow a constrained up and down movement of each wheel relative to the chassis, wherein the upper suspension component on one side of the vehicle is cross-linked with the upper suspension component on the other side of the vehicle by a cross-linkage without direct connection of the cross-linkage to the lower suspension components, and wherein, in order to provide camber compensation, the cross-linkage is arranged so that a downward vertical movement of the outboard end of the upper suspension component on one side relative to the chassis is translated into a lateral inward movement of the outboard end of the upper suspension component on the other side relative to the chassis, and vice versa, irrespective of whether the outboard end of the upper suspension component on the one side is connected to the respective wheel mounting, so that, in use, due to the direct connection between the outboard ends of the upper suspension components and the respective wheel mountings, said lateral inward movement of the outboard end of the upper suspension component on the other side results in an equal lateral inward movement by said upper portion of the respective wheel mounting, and so the chassis structure acts to constrain the rotational plane of each wheel towards an orientation which is substantially normal to the road surface while allowing the chassis to move vertically and to roll relative to the wheels during cornering, acceleration, deceleration and combinations thereof.

2. A motor vehicle chassis structure according to claim 1 in which the upper suspension components on each side are cross-linked to the corresponding components on the other side in such a way that a vertical movement of the wheel relative to the chassis on one side is arranged to feed a compensating change in the inclination in a lateral direction of the wheel relative to the chassis on the other side.

3. A motor vehicle chassis structure according to claim 1, in which the cross-linkage comprises cross-links, provided by a mechanical linkage.

4. A motor vehicle chassis structure according to claim 3 in which the cross-links are two rigid links, wherein the upper suspension components on each side of the vehicle comprise a top arm and a rigid arm, each rigid link is pivotally joined at one end to an inboard end of the top arm on one side, whose outboard end is pivotally joined to an upper end of a wheel mounting on one side of the vehicle, and each rigid link is pivotally joined at its other end to the lower end of the rigid arm pivotally joined to the chassis on the other side of the vehicle, said rigid arm being pivotally connected to the top arm on said other side.

5. A motor vehicle chassis structure according to claim 1 wherein a spring unit is mounted so as to extend between the chassis and either an upper end of each suspension upright on which a wheel is mounted, or an upper suspension component, and each point of attachment provides for pivoting between the end of the spring unit and the chassis at one end, and the suspension upright or upper suspension component at the other end.

6. A motor vehicle chassis structure according to claim 4 wherein the spring unit extends between two points of attachment at an acute angle to the vertical.

* * * * *